(12) United States Patent
Weiland et al.

(10) Patent No.: US 7,090,791 B2
(45) Date of Patent: Aug. 15, 2006

(54) EXTRUSION MOLDING PROCESS

(75) Inventors: Richard A. Weiland, Crestline, CA (US); Sing-Lit Jim, Alhambra, CA (US); Roger Wang, Upland, CA (US)

(73) Assignee: ISPA, Inc, Las Vegas, NV (US)

( * ) Notice: Subject to any disclaimer, the term of this patent is extended or adjusted under 35 U.S.C. 154(b) by 306 days.

(21) Appl. No.: 10/126,735

(22) Filed: Apr. 19, 2002

(65) Prior Publication Data

US 2002/0175435 A1 Nov. 28, 2002

Related U.S. Application Data

(60) Provisional application No. 60/285,196, filed on Apr. 20, 2001, provisional application No. 60/313,960, filed on Aug. 20, 2001.

(51) Int. Cl.
*B29C 49/04* (2006.01)
*B29C 49/20* (2006.01)

(52) U.S. Cl. ............ 264/40.3; 264/45.1; 264/209.3; 264/247; 264/297; 264/515; 264/516; 264/524; 264/540; 264/571; 264/572

(58) Field of Classification Search .......... 264/40.3, 264/45.1, 247, 297, 515, 516, 524, 540, 571, 264/572, 209.3
See application file for complete search history.

(56) References Cited

U.S. PATENT DOCUMENTS

| | | | | |
|---|---|---|---|---|
| 3,135,640 A | | 6/1964 | Kepka et al. | |
| 3,267,185 A | * | 8/1966 | Freeman, Jr. | 264/525 |
| 3,632,261 A | * | 1/1972 | Gasior et al. | 425/531 |
| 4,802,833 A | * | 2/1989 | Shapler | 425/131.1 |
| 5,464,107 A | * | 11/1995 | Koeniger | 215/12.2 |
| 5,922,269 A | | 7/1999 | Gronnevik et al. | |
| 6,056,527 A | * | 5/2000 | Bunyan et al. | 425/113 |
| 6,444,149 B1 | * | 9/2002 | Valentinsson | 264/45.9 |
| 6,659,020 B1 | * | 12/2003 | Ball | 108/57.28 |

FOREIGN PATENT DOCUMENTS

| | | | |
|---|---|---|---|
| EP | 0573683 A1 | * | 12/1993 |
| FR | 002751583 A1 | * | 7/1996 |
| JP | 54058766 A | * | 5/1979 |
| JP | 405220739 A | * | 8/1993 |

* cited by examiner

*Primary Examiner*—Suzanne E. McDowell
(74) *Attorney, Agent, or Firm*—Trucker Ellis & West LLP (57) ABSTRACT

A molding process is disclosed in which an extruded column of plastic is introduced into a mold cavity having a predetermined surface profile. A region of negative air pressure is created inside the mold cavity, exterior to the extruded column. The negative air pressure is applied to the exterior of the extruded column to draw the extruded column into contact with the entire surface profile of the mold cavity, to produce a molded article. The invention can also include a step of co-extruding multiple types of plastic resulting in an extruded column having multiple layers, to produce a molded article having multiple layers. The present method also includes a step of internally inserting a component into the extruded column at a predetermined position so that it will end up at a predetermined position of the molded article after the molding process.

17 Claims, 8 Drawing Sheets

EXTRUSION MOLDING PROCESS

CROSS REFERENCE TO RELATED APPLICATIONS

The present application claims the benefit of U.S. Provisional Application 60/285,196, filed Apr. 20, 2001 and U.S. Provisional Application 60/313,960, filed Aug. 20, 2001.

BACKGROUND OF THE INVENTION

The present invention is directed to the field of extrusion molding technology, particularly for fashioning large articles. Various molding processes are known for fashioning articles of polymer materials, such as blow molding. In a blow molding process, a "parison" (i.e. tube of extruded plastic) is extruded into a mold, and high-pressure air is blown into the mold to force the plastic to the edges of the mold cavity. It is known to use a continuous high-speed, high-volume blowing molding process for bottles. While such a blow molding process is perfect for making small parts like bottles, it is absolutely unsuited for making large plastic parts, such as a plastic pallet, because of its many limitations. When blowing a large plastic part, such as a plastic pallet, there will be too many areas of uneven stretching, especially for corners, edges and deep draws, resulting in extremely weak structural integrity. Also, in order to blow out a large part, the extruded parison in this process must be of a very large diameter, which creates certain physical limitations. The extruded parison will have walls too thick to be properly blown out by the blow molding process, and the concentrated weight of the plastic will create sagging and elongation. Also, a high level of inconsistency is encountered in the finished product.

It is often desirable to add color to a molded product. Under the standard process, color or pigment must be incorporated into the entire polymer. However, this approach results in excess cost since a pigment medium requires a higher quality plastic material, either virgin or high quality recycled plastic. Thus, the entire part must be made up of higher cost material, and it would not be possible to use a less expensive type of recycled plastic. It is known to use multiple layers in blow molding small parts such as bottles. For example, plastic bottles for food products may have an ultraviolet-blocking layer to preserve food freshness and increase shelf life of a product. It may also be desirable to add a colored pigment layer to a product to avoid the above-indicated difficulties. However, it is not feasible to use a multiple layer process in the manufacture of most large objects. It is known that such a multi-layer process can be successfully in making large objects that are of a simple, generally round shape, for example applying a color layer in the manufacture of trash cans and barrels. However, this process for making these objects is in most cases intermittent and not continuous, requiring considerable handling and special steps by manufacturing personnel.

It is known to manufacture large objects such as plastic pallets on a limited basis with a blow molding process. However, this process is also intermittent and non-continuous, requiring considerable handling and special steps by manufacturing personnel. Also, many other problems are associated with this process. The pallet-making process is necessarily a single-layer process, where the article can only be formed of a single layer of plastic, and does not allow using multiple layers. Thus it is difficult to obtain the benefits and flexibility that would result from controlling various parameters, including strength, weight, color, cost and level of anti-skid effectiveness, fire retardance, barrier protection, UV protection and recycle content of materials used. Also, since each part must be handled separately, and production is intermittent and not continuous, the plastic in the extruder and the extrusion header accumulates and overheats for an extended time while waiting for the next cycle, thus resulting in degradation of the plastic resin. Such pallets also suffer from the aforementioned problems with over-stretching at corners, edges and deep draws, and the extruded parison over-stretches under its own weight as it is coming down into the mold. Further, since the extrusion cycle is slow, the cooling of the extruded parison is uneven, with the lower end being progressively cooled at a much more excessive rate. This results in uneven blowing and an inferior surface finish.

Pallets manufactured in the conventional manner tend to have a smooth surface, and so extra steps must be taken to achieve anti-skid utility. It is common to spray or paint an anti-skid coating material such as epoxy, solvent or glue. Additionally, foreign materials like sand or rubber shreds are sometimes applied with the coating for better traction. It is also known to insert rubber grommets or strips into the product surface to provide an anti-skid surface. Also, it is known to machine the product surface to roughen it up and provide traction. These methods are performed after the product is made, resulting in extra manufacturing steps. They also result in other problems. In the coating method, epoxy, rubber, sand etc. are incompatible material with the plastic resin, and are not recyclable, as would be desired. The same is true with the rubber grommet and strip inserts, which are also very expensive and fall off easily. The surface machining method is again labor intensive and is not very effective as an anti-skid surface. Furthermore, a machine-roughed surface traps dirt and contaminants and is not believed to provide sufficient cleanliness to obtain USDA approval for food applications.

Similar difficulties are encountered in providing a fire-retardant plastic pallet. Fire-retardant material is very expensive, and the blended resin costs over four times that of a standard polymer without the fire-retardant additive. The resin with the fire-retardant additive is extremely heavy, making it undesirable and unsuitable for shipping and handling because of potential for injuries. Also, the resulting product with the additive is very brittle and breaks and cracks very easily, resulting in reduced strength and a short useful life. Because of the high quantity of additive required, the plastic part is not suitable for recycling, further limiting the incentive to a widespread usage.

Other issues are important in the manufacture of pallets and other large molded items. On one hand, it is important to provide as much mechanical strength as possible. On the other hand, it is desirable to provide impact resistance. This is often accomplished by making plastic products of structural foam. However, in the structural foam process the foaming has to be done throughout the product and may require a certain amount of sacrifice in rigidity and mechanical strength. In other applications, a barrier between the inside content and the outside environment is often a crucial feature in certain type of product. One obvious example is the gasoline tank used in an automobile. Barrier materials in almost all cases are very expensive. Moreover, depending on the type of barrier materials used, they could have problems with being too heavy or too rigid. Products for some markets may require an antistatic feature. Some of the common industries require an anti-static feature, such as the chemical industry where static can spark and thereby create a fire hazard, and the electronic industry with sensitive electronic components that static electricity may interfere or damage. Anti-static additives are again expensive and result in penalties in physical properties.

In a typical extruded polymer molding process (including blow molding, and other type of profile extrusion with hollow core,) it has been difficult to perform steps of in-filling of material(s) and/or fibers to the inside of column for enhanced physical properties, including higher strength, better impact resistance, better flexural properties, and higher tensile strength. The difficulties with such in-filling of material(s) and/or fibers limits the type of polymer products that can be manufactured and restricts the innovation and design of polymer products that could have been made as preferable alternative to the replacing of existing utilities, including the making of a polymer structural post or other types of polymer support structures.

The in-fill of foamed material offers polymer parts that are more impact resistant, high in insulation value, and high in tensile and flexural strength. However, in typical molding processes, the in-filling of materials including foamed material into the internal cavities of a molded product is a very cumbersome, costly, and slow process, and offers less than ideal quality in the finished product. A common process where in-filling of material generally takes place is rotational molding and/or urethane batch mixing and filling, which is an expensive and slow process.

In utilizing typical molding processes, it is known that when fibers (natural or synthetic) like fiberglass or hemp are introduced into polymer and sent through the molding machine system (such as but not limited to extruders, accumulator, injection port etc.,) the fibers have a natural tendency to align themselves in the same direction. This tendency for fibers to line up creates undesirable consequences, including the lowering of maximum strength, tensile and flex potential, and the increase in surface cracks and brittleness for the fibers embedded polymer.

In a typical molding process, it would be desirable if a color or clear stripe could be applied or embedded into a molded polymer product for identification or aesthetic purposes. However, such a striping system is not available for products that are manufactured under the typical extrusion molding processes as described above.

SUMMARY OF THE INVENTION

The difficulties and drawbacks associated with previous methods and products are overcome by the molding process of the present invention in which an extruded column of plastic is introduced into a mold cavity having a predetermined surface profile. A region of negative air pressure is created inside the mold cavity, exterior to the extruded column. The negative air pressure is applied to the exterior of the extruded column to draw the extruded column into contact with the entire surface profile of the mold cavity, to produce a molded article. The invention can also include a step of co-extruding multiple types of plastic resulting in an extruded column having multiple layers, to produce a molded article having multiple layers. The present method also includes a step of internally inserting a component into the extruded column at a predetermined position so that it will end up at a predetermined position of the molded article after the molding process.

As will be realized, the invention is capable of other and different embodiments and its several details are capable of modifications in various respects, all without departing from the invention. Accordingly, the drawing and description are to be regarded as illustrative and not restrictive.

DETAILED DESCRIPTION OF THE INVENTION

The present invention will now be described with particular reference to the drawings where it is understood that like reference numerals refer to like elements in all the figures. The present invention is directed to a process for forming large objects having multiple layers, to obtain many benefits unobtainable with previous processes. The problems of previous systems are overcome in the present invention due to the careful control of positive and negative pressures, both within the extruded column and in the mold cavity external to the extruded column. The present process is also a continuous process that reduces material handling and increases productivity. The full machine process includes the feeding of plastic materials, and the extrusion of these materials through a multi-layer extrusion head. A continuous multi-layer extruded column is produced having one or more layers as necessary to satisfy the functionality requirements of the particular application. The process also includes an internal inserting mechanism for inserting a desired item into the extruded column. A continuous rotation multiple-mold wheel is employed, with a stamping and conveying mechanism. These process steps and features will be described below in greater detail.

The present process preferably produces a multiple layer product, but is by no means limited to the same. In applications where a multiple layer product is desired, a molding machine including multiple hoppers will be employed, with each hopper funneling one or more material into an extruder dedicated for each layer. In the case of a single layer product, all but one hopper/extruder will normally be turned off. Each hopper is equipped with ratio device meters to control the quantity of intake materials entering each of the hoppers. The metering could be based on ratios in weight or volume, and the material or materials can be a combination of liquids, flakes, pellets, concentrates, powders, and pre-melted plastics. The types and the numbers of extrusion stations are dependent upon the functionalities and the types of layers to be incorporated into the finish products.

Figure 1A:
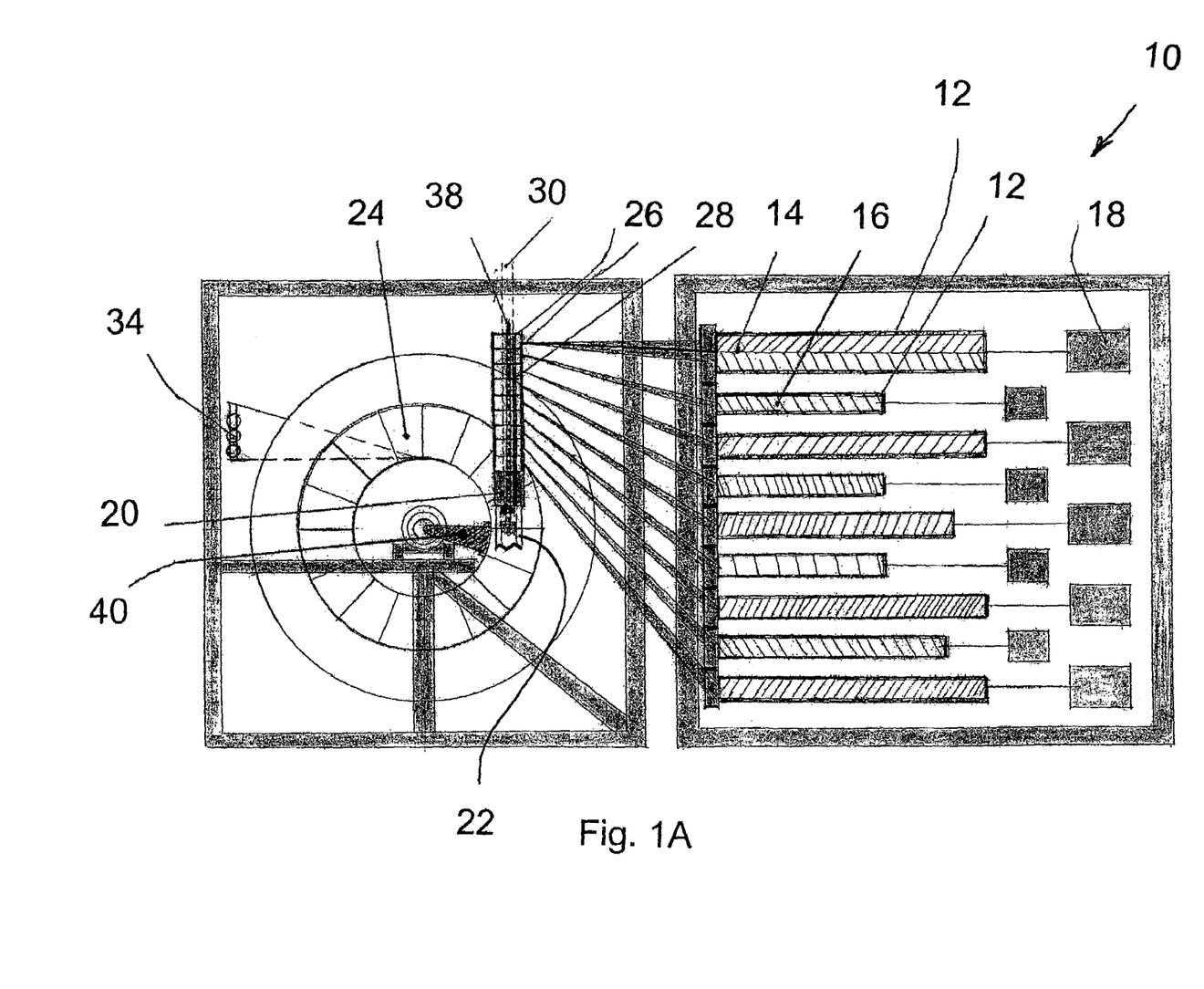
FIGS. 1A, 1B and 1C respectively show an exemplary extrusion machine and side and cross-sectional views of an exemplary extrusion head that can be used for the process and article produced therefrom, in accordance with the present invention.

FIG. 1A shows an exemplary depiction of an extrusion and molding machine 10 in accordance with the present invention. The present machine 10 includes one or more extruders 12 that can be optionally selected from different size extruders depending on the desired extrusion volume and the type of polymer material. The extruders 12 include one or more extruder screws for providing an extruded column of polymer. The extruder screws can each optionally be a double screw 14 or a single screw 16, depending on the physical properties (e.g. viscosity, etc.) of the specific types of polymer materials to be extruded. The extruders 12 each include an extruder motor 18 so as to drive the extruder screws.

Figure 1B:
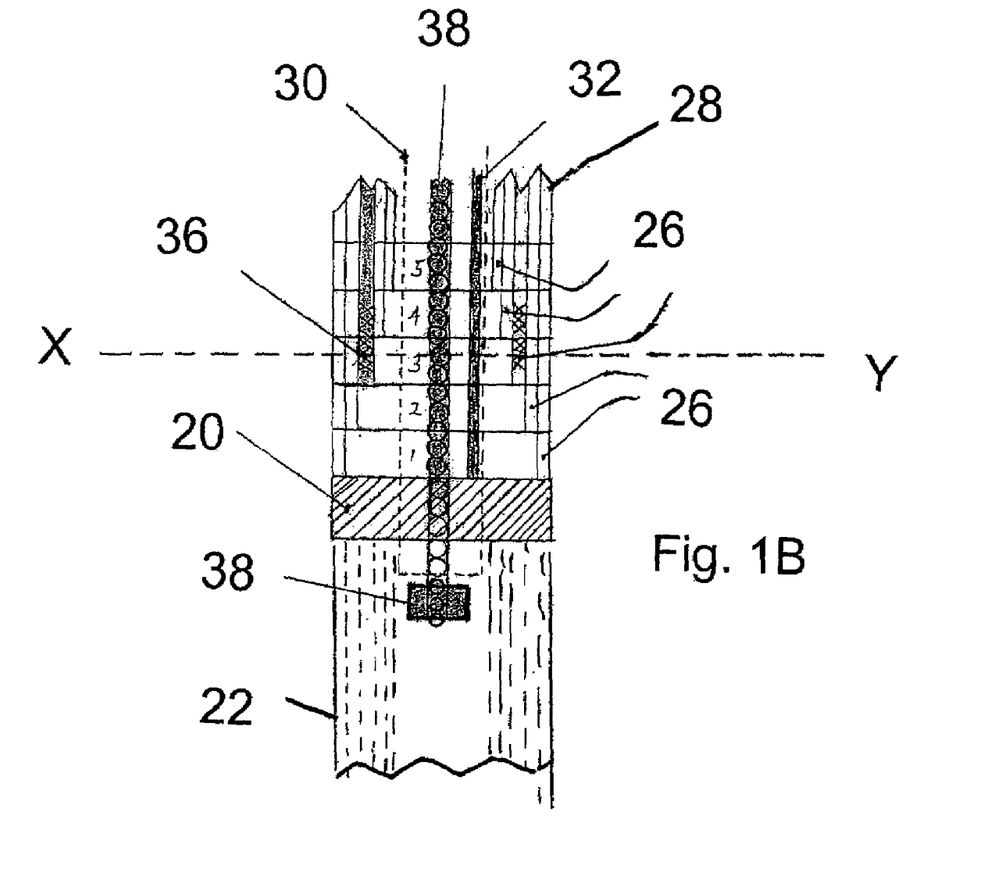
Figure 1C:
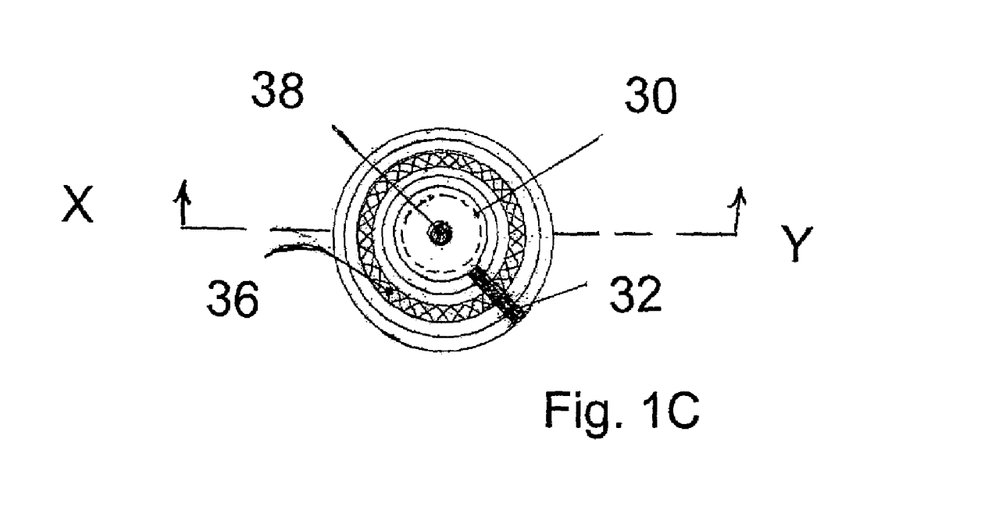
Figure 2:
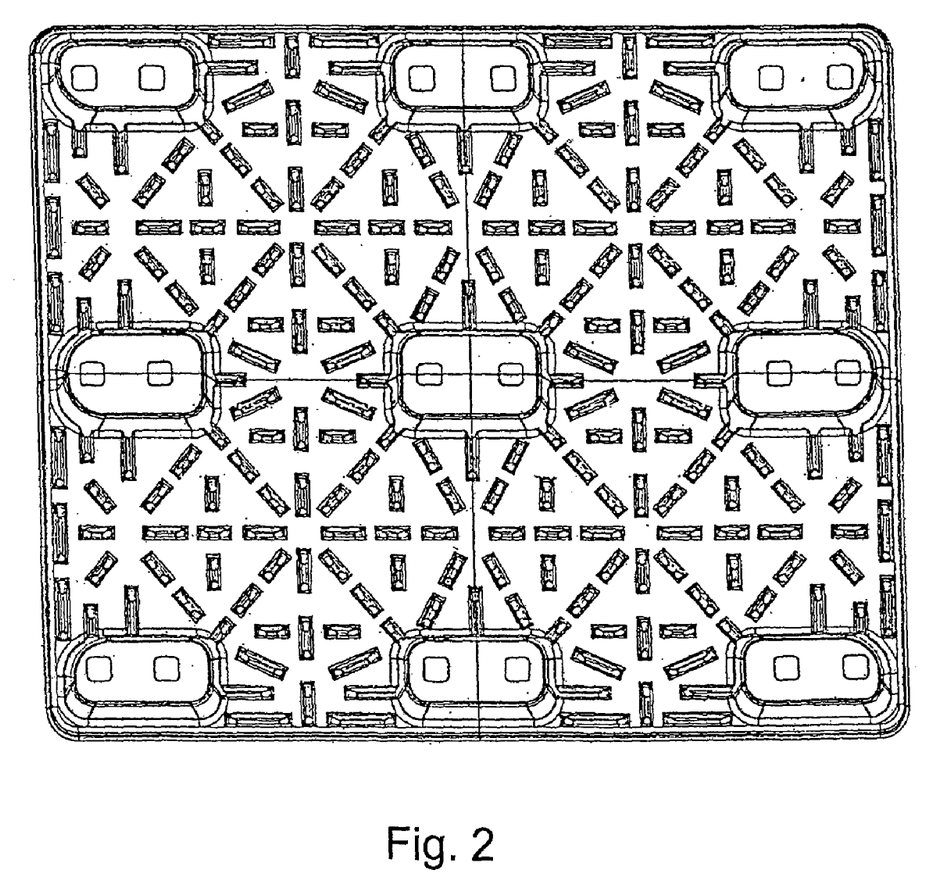
FIG. 2 is a top view of a pallet product manufactured by the process of the present invention.
Figure 3A:
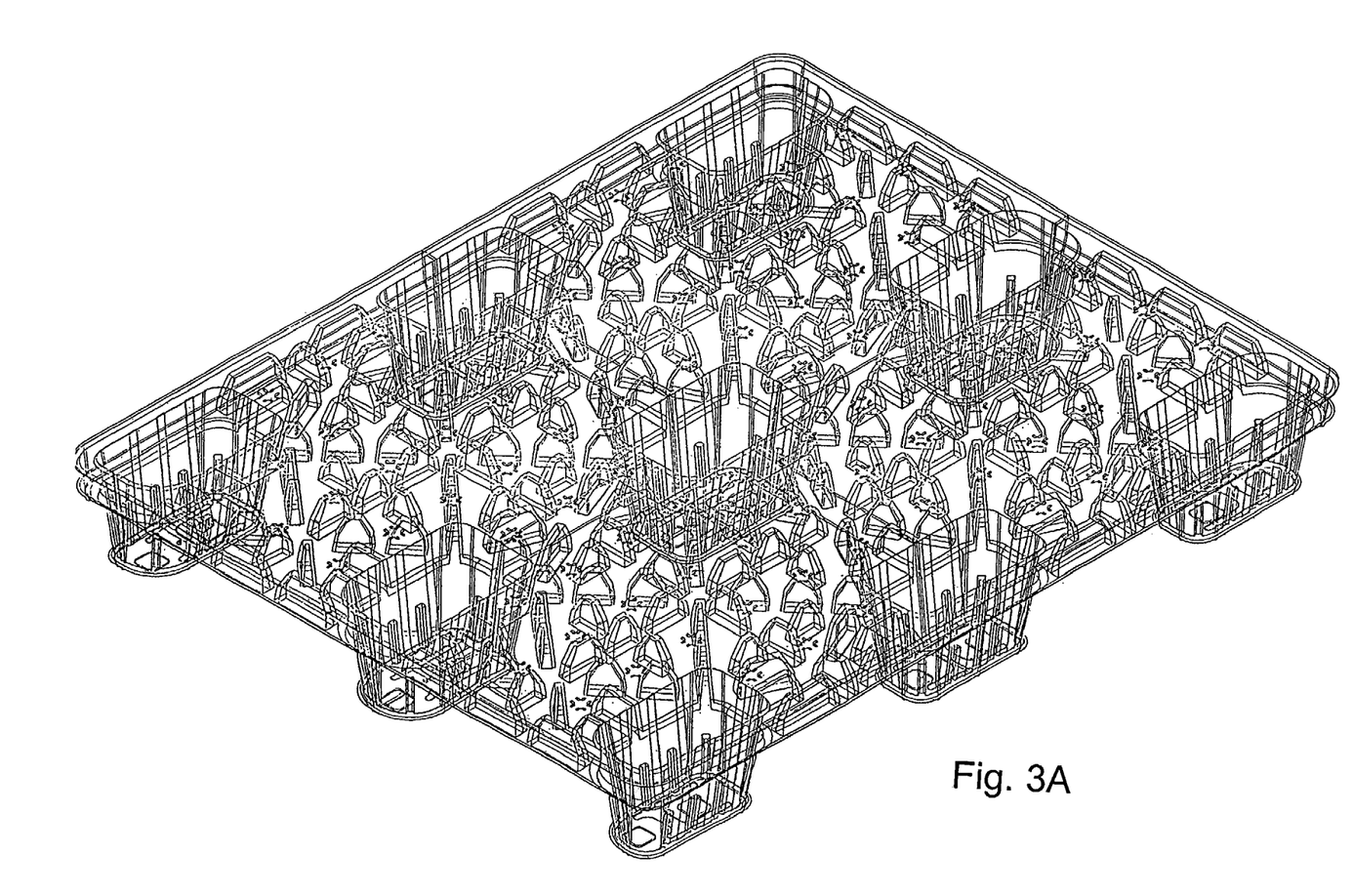
FIGS. 3A, 3B, and 3C are oblique phantom views showing internal details of the pallet product manufactured by the process of the present invention.
Figure 3B:
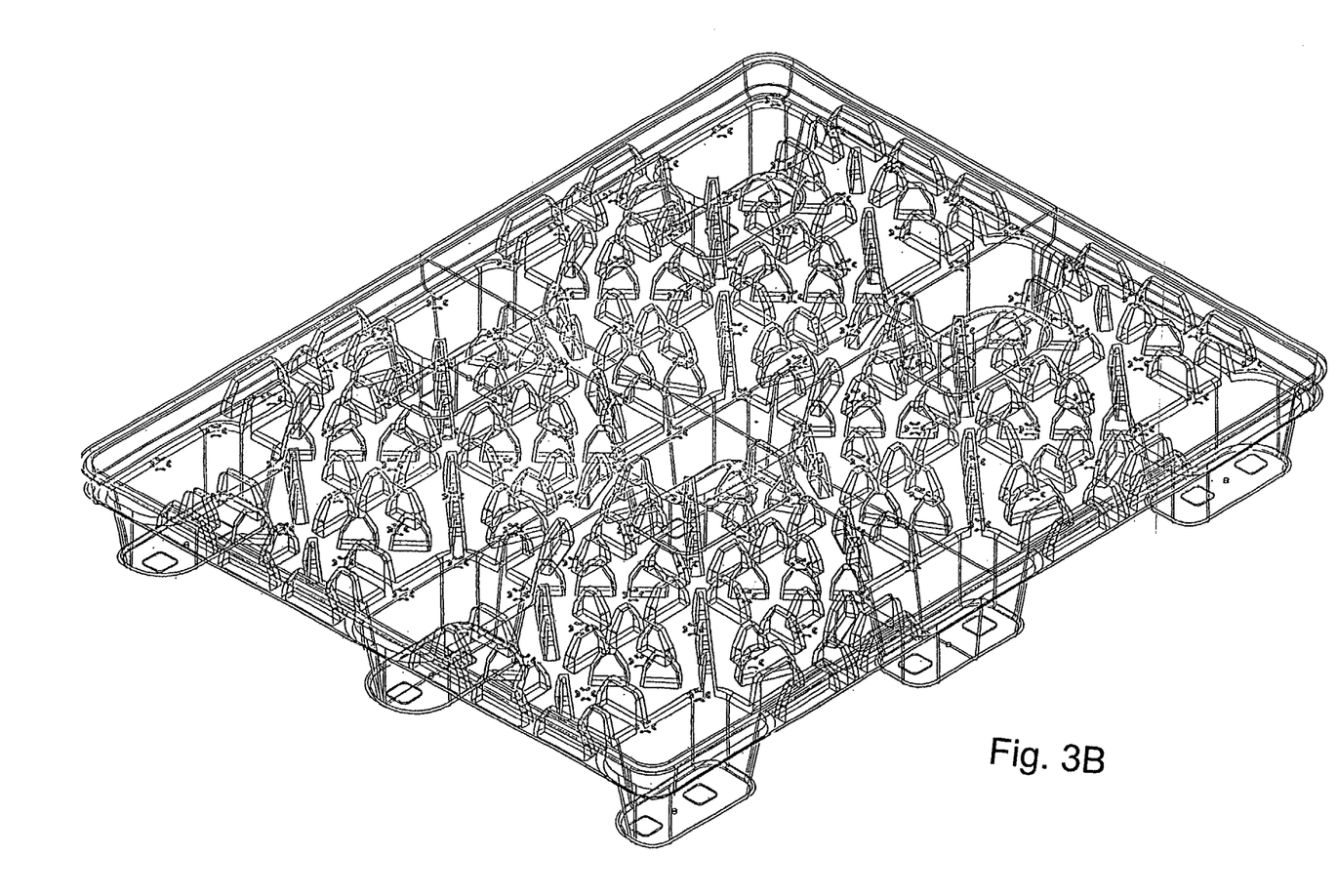
Figure 3C:
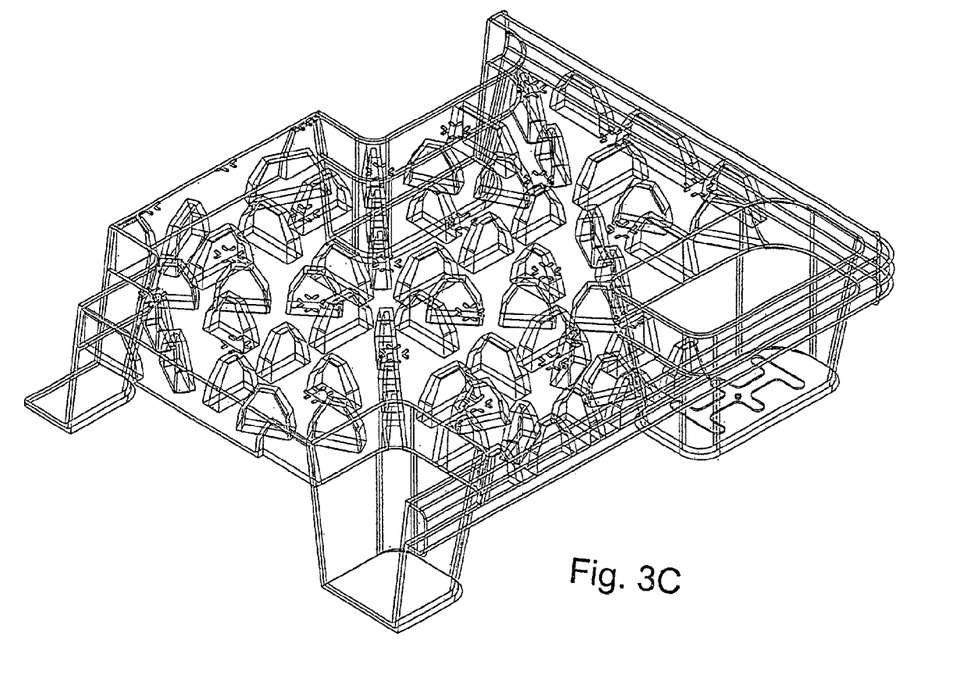
Figure 4A:
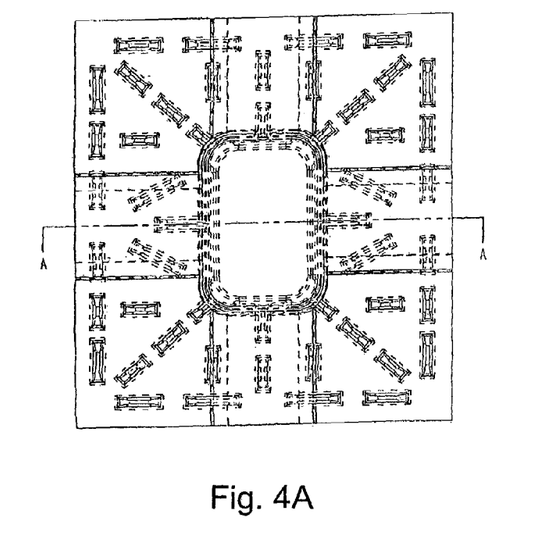
FIGS. 4A, 4B, 4C, 4D are respective top phantom, side-sectional, detail and oblique views of the pallet product manufactured by the process of the present invention.
Figure 4B:
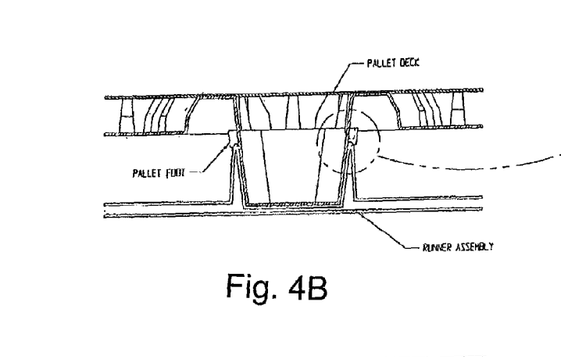
Figure 4C:
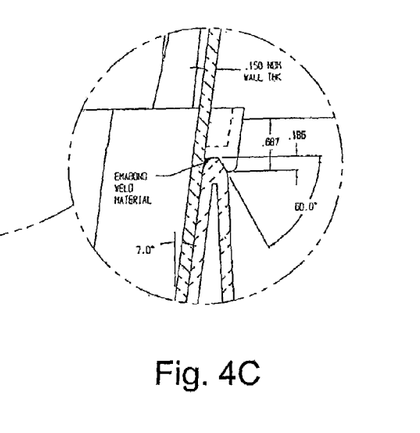
Figure 4D:
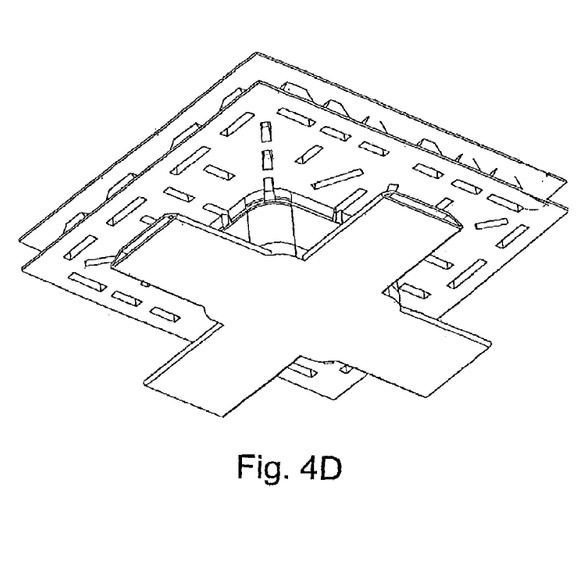
Figure 5A:
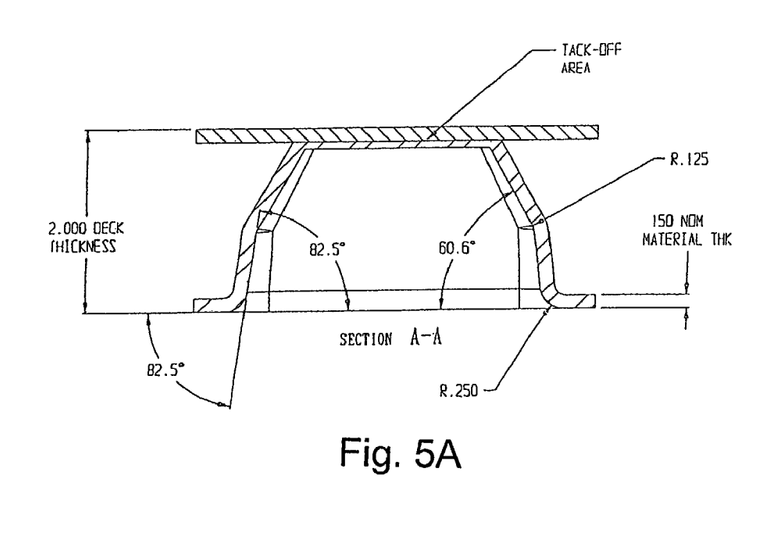
FIGS. 5A, 5B, 5C, 5D are respective side-sectional, oblique, bottom and bottom sectional views of the pallet product manufactured by the process of the present invention.
Figure 5B:
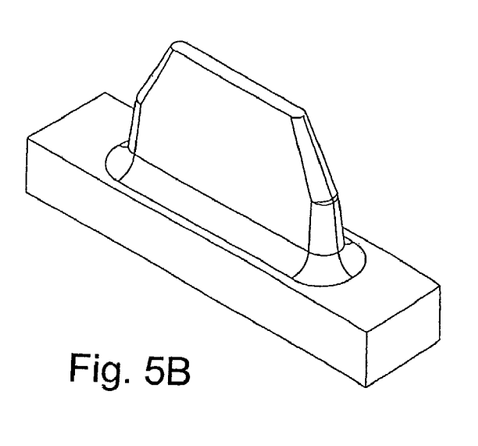
Figure 5C:
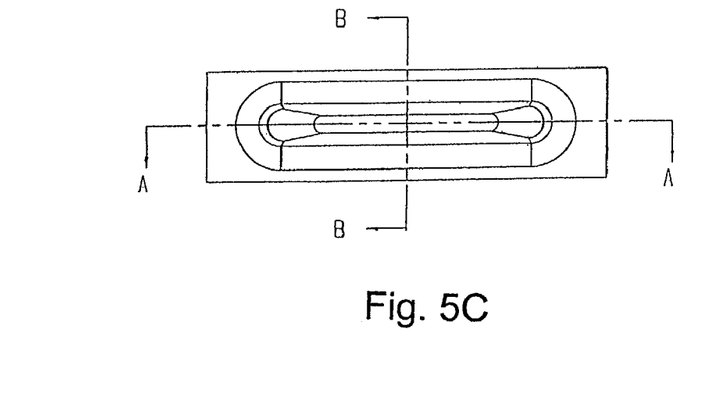
Figure 5D:
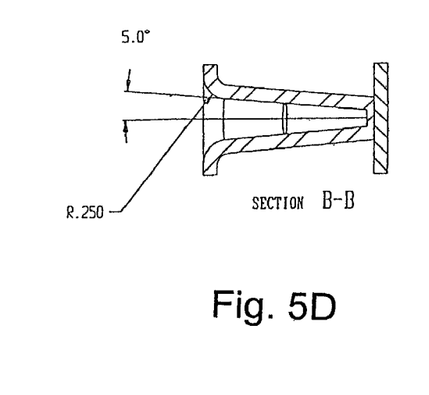

As especially shown in detail in FIGS. 1B and 1C, the present machine 10 includes an extrusion head 20 for receiving the output of the various extruders 12 and producing a multi-layer extruded column 22. Of course, it is understood that a single layer extruded column could also be extruded without departing from the invention. The extrusion head 20 includes a body portion 28 preferably having a plurality of concentric column cavities 26, where each cavity 26 extrudes material from each extruder 12, so as to create the multi-layer extruded column 22. The extruded column 22 is extruded into one or more machine molds 24 where a molded part is formed.

As special features of the invention, the present machine 10 and extrusion head 20 further include an internal insertion mechanism 30 for inserting an object into the polymer column. A physical mechanism 32 is also provided for creating strips within the extruded polymer column. A striping mechanism 34 is provided for attaching stripes to the extruded polymer column. A fiber mixing zone 36 is provided for random fiber alignment. An internal material applicator 38 is provided for the application of internal materials. Separate stage injection runner ports 40 are provided for separate stage injection. These components will be discussed in greater detail below, with respect to the specific applications.

The present multiple-layer extruder produces an extruded column 22 of plastic, preferably having multiple layers arranged concentrically around the axis of the extruded column 22. The multiple layers of the extruded column 22 can have various geometric cross-sections, preferably of circular or oval cross-section. The multiple layers can be extruded so as to result in predetermined variations in layer thicknesses across horizontal, vertical and/or diagonal cross-sections.

The extruded column 22 is extruded continuously into a mold cavity of the machine mold 24. As the column is being continuously extruded, it will preferably be cradled onto a mold having at least two sections that close around the extruded column. The mold is preferably one of several molds mounted on a continuously rotating wheel, in order to provide a continuous manufacturing process. However, it should be appreciated that the process could be easily employed in a non-continuous, single-mold system, without departing from the invention.

As the mold closes on the extruded column, air is supplied axially through the center of the extruded column, and maintained at a minimal positive air pressure sufficient to offset the weight of the extruded column to prevent the column from collapsing. As the extruded column enters the mold, a vacuum is pulled within the mold cavity to mold the column into shape. The mold includes a plurality of vacuum ports placed at specific strategic locations to draw a negative pressure around the exterior of the extruded column to draw column into the corners and edges of the mold, and also all the nooks and crannies of the mold cavity. The vacuum ports create specific regions within the mold having different negative pressures. Areas producing greater vacuum result in greater drawing of the column toward that direction, while areas of lesser vacuum produce lesser draw. At the same time as negative air pressures are selectively applied to the exterior of the extruded column, positive air pressure is applied internally to the extruded column. In this way, the internal compression mechanism is combined with an external vacuuming to provide careful pressure maintenance in order to carefully manipulate the product into the final desired shape.

To maintain maximum wall thickness and to strengthen the outside edges, the molds and the extruded column are designed to have "flash" or "no flash" around the finish products. In situations where "no flash" is desired, either for cosmetic or functional reasons, the molding mechanism will be designed to required minimal to no stretching. In a traditional blow molding mechanism, the edges and corners are blown out with pressure and inadvertently stretched thinner, creating areas of structural weakness. However, since no internal pressure loads are applied against the flash line, this problem does not occur in the present process. In fact, with the present process, the flash lines are somewhat thicker and thus stronger, and pose no risk as mechanical failure points as can happen with a blow molded product.

By carefully controlling internal and external air pressures, the extruded column is drawn into the desired shape while maintaining the desired thickness of each of the multiple layers, without deforming the thickness or distribution of the layers. Thus, control is established to insure that no regions are created where the walls of the finished product are too thick or too thin.

Also, since the pressures may be dynamically changed during the process, it is possible to create a finished part having a internal full cavity, partial cavities, or no cavity at all. Such internal hollow cavities serve several functions. The overall weight is made much lighter while simultaneously providing improved mechanical strength. This provides for ease of handling and potential reduction of workplace related injuries. Also, cost as a function of material used is also reduced. Further, trapped stagnant cavities are extremely effective for insulation purposes, making it ideal when manufacturing boxes and totes for food and drug industries.

In the manner described above, it should be appreciated that the present process is very different from conventional "blow molding." By controlling pressures as indicated above, a "push/pull" control is established over the extruded column. Though a small positive pressure is maintained inside the column to prevent collapse, the present method is accomplished through the external application of negative pressures.

After the extruded column fills the mold cavity as indicated above, the wheel turns to connect the extruder head to the next mold, and the process is repeated continuously in the next mold. As the molded products are continuously cooled and released from the molds, they are conveyed to a subsequent station for de-flashing. After the de-flashing step, the product is complete and is ready for end-use.

Types of Multiple Layers

As mentioned above, the finished products would preferably include a combination of layers, including but not limited to the following types of layers. The types of layers and the demand made on the extruder can be selected for a particular product application, and thereby create a market for custom-made products (such as plastic pallets) tailor-made for any number of suitable applications.

Color/Pigment Layer: With the present multi-layer approach, a thin outside color layer can be applied to the main body portion of the product, which could be formed of inexpensive recycled materials. This thin layer is all that is necessary to satisfy the color requirement without subjecting ourselves to the excessive high cost of pigment-bearing materials. Plus, the color/pigment could be added to any of other layer or additive that could be on the exterior, resulting in further savings. A normal extruder would be used for the extrusion of this layer.

Anti-Skid Layer: Any anti-skid layer could be formed around a structural body. For example, a linear low density polymer layer could be added as an anti-skid layer to the exterior of an underlying layer (typically high density) of the same material. For example, a soft, frictional anti-skid layer of low-density polyethylene could be applied over a rigid structural body of high-density polyethylene. Many advantages follow from this application of the present method. The layer is formed integrally with no additional labor and handling. Unlike previous-type anti-skid layers, this type of anti-skid layer will not peel off or separate from the underlying layers because it is the same polymer base of different density, thus providing a perfect bonding. Since these respective layers are of the same thermoplastic material, the entire product is perfectly recyclable. The desired frictional properties of the anti-skid layer using this approach could be easily adjusted for specific customer requirements by adjusting the density of the resin, since the frictional property of resin is a function to its molecular density. The resulting anti-skid layer is smooth and easily washable, thereby conforming with FDA and USDA requirements for pallet applications. The anti-skid layer can also be color matched to serve as a color layer. A normal extruder would be used for extrusion on this layer.

Fire-Retardant Layer: By applying a fire-retardant layer, the overall cost is greatly reduced by providing a thin protective layer that serves the same fire-retardant function without using the expensive additive throughout the entire product. The layering also eliminates the heavy weight issue. To minimize the brittleness issues—breaking, cracking and structural problems—a special strength layer is formed within the fire-retardant layer to provide the necessary additional support needed, or by encapsulating it between layers. Since the quantity of fire-retardant additive used is very small when using only a thin layer, the recyclability of the product remains acceptable. A normal extruder will be used for extrusion on this layer.

Strength Layer: In creating a specific strength layer, two separate aspects of technology are applied. The multi-layer process itself provides additional mechanical strength as a well-known inherent property of multiple layers. Also, a specific strength layer can be fashioned to make the polymer super strong and yet recyclable. To achieve the strength requirement, long strand fiberglass, nylon strands and/or other natural fibers such as hemp are blended into the polymer. The material for this layer could be nylon, polyethylene, or polypropylene. In order to maintain length and integrity of the strands, the extruder would have a downstream feeder that would minimize the distance the strands have to travel through the shearing of the screw insider the extruder. Another option to introduce a strength layer is to use nylon alone as the engineered polymer for this layer due to its inherent high strength properties. The benefits for making this strength layer possible are numerous. The strength layer allows for the compensation of the lower structural strength of the other layers, thereby allowing utilization of exotic and unique features and materials to achieve functional utilities such as anti-skid, fire-retardant etc.

Foam Layer: A foam layer can be provided for impact resistance, insulation, weight reduction and volume fill. The present multi-layer process provides a desired level of rigidity and impact resistance by varying the materials and thickness of the foam and non-foam layers. An exterior foam layer can also serve as a color layer, anti-skid and strength layer. Furthermore, most of the interior layers have the flexibility of utilizing either virgin or recycled materials. Providing foaming layers also serves an additive function. Improvement in the insulation factor and weight reduction can be achieved through a combination of varying the degree of foaming and the thickness of the foam layer. In certain specific applications, foaming is effective for the volume filling of cavities. A foam layer or layers can also add mechanical strength, providing a favorable mass to strength ratio. There are two typical ways to introduce foam to the plastics. One is to use standard extruder with chemical foaming agent mixed in with plastics at the hopper or a downstream location. Another way is to have nitrogen gas introduced midway or downstream of the extruder. In the event a foam layer is employed a specific positive fluid pressure (of air and/or another material) applied to the extruded column is critical in preserving the intended degree of foaming for the foam layer and in assuring the intended thickness of the layer or layers.

Barrier Layer: Special impervious material can be applied to the exterior to prevent seeping or movement of content material such as water or solvent through the main body portion. This barrier material can also be combined with a color or other layer. A typical extruder will be used for this purpose. By being able to use a low level of barrier material to ensure a proper barrier, the amount of material cost is greatly reduced, especially for a large plastic product. Moreover, depending on the type of barrier materials used, such materials could have problems with being too expensive and too heavy or rigid if used throughout the whole part. This would not be a problem with the present method, since only a layer of barrier material would be required instead of using such a material throughout the whole part.

Bond Layer: A bond layer could be provided to bond together layers that may otherwise be incompatible and may not bond together well, such as polyethylene and nylon layers. In the case of compatible materials being used between layers that bond well naturally, there will be no need for this bond layer. A normal extruder will be used for this purpose.

Anti-Static Layer: Instead of using an expensive anti-static additive throughout the product in a traditional plastic molding process, the present method provides an outside anti-static shield at a greatly reduced cost. This is a special utility that is very important only to some industries such as the chemical and electronics industries. A typical extruder will be used for this purpose.

UV Layer: The present multi-layer approach allows the incorporation of one or more exterior UV layers to provide for effective protection of the polymer article against harmful ultraviolet radiation from the sun. Exterior UV layers offer advantages over applying the UV additive to the whole polymer article since a higher concentration of UV additive can be added on the outside for a better UV protection without any unnecessary degradation of physical properties. Also, a lower concentration of UV additive could be used on the layers immediately inside the outside layer, thus reducing the level of additive to accommodate the reduced penetration of UV below the surface. This results in a realization of tremendous cost savings by conserving the UV-blocking additive.

Insulation Layer: An insulation layer can be incorporated into the present multi-layer process so as to allow for superior insulation. Such insulation can be utilized as a shield from outside heat or cold, or as an internal heat or cold retention. The mechanics of insulation could be that of a foam layer, stagnant cavity layer, and/or other special insulation material layer. To achieve the best result, a combination of several insulation layers could be used in the same molded article.

Sound Layer: A sound layer can be similarly incorporated into the multi-layer approach to achieve different sound effect objectives. Sound effect layers include but are not limited to sound deflection layer, sound absorption layer, sound attenuation layer, and sound enhancement layer. Such effects (and a combination thereof) can be achieved through the application of different type of material (foamed or not foamed) or cavity layers. Such layers could be on the outside and/or inside surfaces, as well as within internal layers. To achieve the best result, a combination of several sound layers could be used in the same molded article.

Depending on the specific requirements of the particular product, such as a pallet, some of the layers could be combined into one. For example, the color layer could be also an anti-skid layer; the fire retardant layer could also optionally be incorporated into the very same layer. Furthermore, the strength layer could be foamed or not foamed. Depending on the specifications, all the layers could be made of recycled, widespec or virgin materials.

Other advantages are obtained with the multi-layer aspect of the invention. By employing multiple extrusions, a larger extruded column can be produced than is obtainable with a single extruder, resulting in a larger finished product. As contemplated, the present multi-layer process can allow extrusions in excess of 10,000 lbs. of plastic per hour, thereby resulting in greater production speed, even if all the layers are formed of the same material. It is also possible to selectively turn off one or more extruders to create a smaller extruded column, in order to select the size and speed of the extrusion. In this way, the present multi-layer process provides flexibility and control not obtainable with previous processes.

Internal Insertion Mechanism

As a distinct special feature of the invention, a device or other component can be internally inserted into the finished polymer product by inserting it into or onto the inside wall of the extruded column or even a profile during manufacture. This device can be an RFID (Radio Frequency Identification Device), a bar code or other device used for tracking and identifying purposes, or to provide any other type of desired functionality. The device can also include a solid state microchip containing information that can be hard-coded or erasable. The device can also include a transponder, operating with either an active power supply or through passive reflection. The device can operate with a sonometric or magnetic read/write system, or using optical, radio frequency, or another band of the electromagnetic spectrum. In the present continuous, automated process, the device will be inserted into the inside wall of the extruded polymer column during manufacture. This is preferably accomplished by using a mechanical arm to pick up the device and place it through an opening in the extrusion head and into the extruded column before the part or product is formed. By properly placing the device in a specific portion of the extruded column, the device will end up in the desired part of the finished product when the extruded column is manipulated into its finished shape by this process.

Internal Material Applicator

It is a distinct special feature of the present invention to employ an "internal material applicator" 38 positioned through the opening of the extruder head and into the inside cavity of the extruded polymer column. The specific design of the applicator 38 can be selectively varied depending on the types of one or more materials and/or one or more fiber types to be applied to the molded part and on the extent of the application.

In one specific application, an in-fill of foaming material can be employed. The applicator 38 would preferably be a spindle equipped with feed lines near the top of the spindle feeding nitrogen, chemical or others to material that is passing through the spindle system. By the time the foaming material travels through the spindle and is spun out through openings in the spindle to the internal wall of the extruded column, a layer or a complete in-fill of foamed material would have been successfully introduced.

In another aspect of the invention, fiber materials can be introduced into the extruded column. In this embodiment, the applicator 38 would preferably be configured to apply fibers onto the inside wall of the column. In one exemplary aspect (to which the invention would not be limited) a chopped spray applicator could be employed that spins to chase the fibers onto the inside wall.

In still another aspect of the invention, an internal application of one or more types of thermal set materials can be introduced. In this embodiment, the feed lines would be designed to take in A/B mixes of chemical, with the thermal set mixture being mixed as the mixtures travels down the applicator, and is spun out of openings onto the internal wall, forming either an inside layer alone or optionally completely filling out the interior volume of the cavity. These internally introduced materials and/or fibers provide considerable benefits to the finished product, including additional strength, impact, flexural and tensile property and other desirable properties as would be enabled by the selection of various types of materials.

Separate Stage Injection

In still another further aspect of the invention, a distinct special feature of the present invention is provided by a separate injection system equipped with separate stage injection runner ports 40 latched onto the underside of the mold as the extruded column 22 is compressed together by closing molds. As the injection system latches onto the mold, injection pins from the system will penetrate through one or more of the polymer walls and in-fill one or more of the internal cavities with one or more types of materials. In addition, the injection system is equipped with a self-sealing mechanism so that when the injection pins are pulled out, the holes are sealed. This separate stage injection can be performed in the continuous process or configuration of the preferred embodiment, but also in a separate or later molding stage after the initial molding of the product is already completed.

Random Fiber Alignment

In yet another further aspect of the invention, a distinct special feature of the present invention is provided for applications in which fibers are introduced into the molten polymer. In this embodiment, the molten polymer with fibers is pushed through a "fiber mixing zone" 36 whereby the fibers are randomly aligned. Such mixing can be achieved in a variety of ways. In one aspect, static mixers of various designs could be incorporated into the extruder head, preferably but not limited to mixers of the low shear type. Another would be to provide crisscrossing finger channels into the extruder head whereby the polymer is pushed through before extrusion for random mixing. The concept of random fiber alignment is applicable to all polymer molding processes, including but not limited to the multi-layer molding process. In such multi-layers process, a "fiber mixing zone" could be created and be ideally located in one or more respective column cavities 26 dispensing a fiber-embedded layer, at or near the mouth of the multi-layer extruder head 20.

Striping System

In an additional aspect of the invention, a distinct special feature is provided in a mechanism 34 for applying one or more stripes onto the extruded column as it is exiting. The one or more stripes can be applied to the outside of the extruded column using one or more continuous ribbons on rollers whereby the one or more ribbons are pressed onto the still-cooling wall. Alternatively, to provide a viewing window stripe to the single layer or multi-layer extruded column, a separate stripe of extrusion window material 32 is set interrupting through the one or more layers of the extrusion head. Depending on the intended purpose of the stripe, clear or color material can be extruding through the extrusion window. For example, a clear window can be used to provide e.g. a liquid level indicator in a molded part intended to contain a liquid.

As described hereinabove, the present invention solves many problems associated with previous type devices. However, it will be appreciated that various changes in the details, materials and arrangements of parts which have been herein described and illustrated in order to explain the nature of the invention may be made by those skilled in the area within the principle and scope of the invention will be expressed in the appended claims.

We claim:

1. A molding process comprising:
introducing an extruded polymer column into a mold cavity having a predetermined surface profile;
creating a region of negative air pressure inside the mold cavity, exterior to the extruded column; and
applying the negative air pressure to the exterior of the extruded column to draw the exterior of the extruded column into contact with the entire surface profile of the mold cavity, to produce a molded article;
wherein the extruded column is continuously extruded and wherein the mold cavity is formed within a mold that is one of a plurality of molds each having mold cavities, wherein the molds are alternately moved into engagement with the extruded column, so as to provide a continuous, automated molding process; and
wherein the extruded column is cradled to prevent mechanical collapse during the molding process.

2. The molding process of claim 1 wherein the plurality of molds are supported on a continuous support mechanism.

3. The molding process of claim 2 wherein the continuous support mechanism comprises at least one of a wheel or a shuttle for continuously supporting the plurality of molds.

4. A molding process comprising the steps of:
introducing an extruded polymer column into a mold cavity having a predetermined surface profile:
creating a region of negative air pressure inside the mold cavity, exterior to the extruded column;
applying the negative air pressure to the exterior of the extruded column to draw the exterior of the extruded column into contact with the entire surface profile of the mold cavity, to produce a molded article; and
flashing the extruded column to the edges of the mold cavity,
wherein the extruded column is continuously extruded and wherein the mold cavity is formed within a mold that is one of a plurality of molds each having mold cavities, wherein the molds are alternately moved into engagement with the extruded column, so as to provide a continuous, automated molding process.

5. A molding process comprising the steps of:
introducing an extruded polymer column into a mold cavity having a predetermined surface profile;
creating a region of negative air pressure inside the mold cavity, exterior to the extruded column;
applying the negative air pressure to the exterior of the extruded column to draw the exterior of the extruded column into contact with the entire surface profile of the mold cavity, to produce a molded article;
injecting an in-fill material into an interior cavity of the molded article; and
self-sealing the molded article,
wherein the extruded column is continuously extruded and wherein the mold cavity is formed within a mold that is one of a plurality of molds each having mold cavities, wherein the molds are alternately moved into engagement with the extruded column, so as to provide a continuous, automated molding process.

6. A molding process comprising the steps of:
co-extruding multiple types of plastic to produce an extruded column having multiple layers;
introducing the extruded column of plastic into a mold cavity having a predetermined surface profile; and
drawing the exterior of the extruded column into contact with the entire surface profile of the mold cavity, to produce a molded article having multiple layers;
wherein the extruded column is continuously extruded and wherein the mold cavity is formed within a mold that is one of a plurality of molds each having mold cavities, wherein the molds are alternately moved into engagement with the extruded column, so as to provide a continuous, automated molding process.

7. The molding process of claim 6 wherein the extruded column is cradled to prevent at least one of mechanical stretching and collapse during the molding process.

8. The molding process of claim 6 wherein the step of applying negative air pressure to draw the extruded column comprises the step of flashing the extruded column to the edges of the mold cavity.

9. The molding process of claim 6 further comprising a the steps of:
injecting an in-fill material into an interior cavity of the molded article; and
self-sealing the molded article.

10. A molding process comprising the steps of:
extruding an extruded column of polymer;
internally inserting a component into the extruded column at a predetermined position;
introducing the extruded column into a mold cavity having a predetermined surface profile;
molding the extruded column into contact with the entire surface profile of the mold cavity, to produce a molded article;
controlling the step of molding so that component will end up at a predetermined position of the molded article after the molding process, wherein the controlling step comprises:
creating a region of negative air pressure inside the mold cavity, exterior to the extruded column; and
applying the negative air pressure to the exterior of the extruded column, to draw the exterior of the extruded column into contact with the entire surface profile of the mold cavity;

maintaining a predetermined positive internal air pressure within the extruded column, to prevent the interior of the extruded column from collapsing under the step of applying the negative pressure, wherein the step of maintaining a predetermined positive internal air pressure comprises the step of forming an internal hollow cavity in the molded article, and wherein the positive and negative air pressure is dynamically controlled throughout the molding process.

11. The molding process of claim 10 wherein the extruded column is continuously extruded and wherein the mold cavity is formed within a mold that is one of a plurality of molds each having mold cavities, wherein the molds are alternately moved into engagement with the extruded column, so as to provide a continuous, automated molding process.

12. The molding process of claim 11 wherein the plurality of molds are supported on a continuous support mechanism.

13. The molding process of claim 12 wherein the continuous support mechanism comprises at least one of a wheel or a shuttle for continuously supporting the plurality of mold.

14. The molding process of claim 13 wherein the extruded column is cradled to prevent at least one of mechanical stretching and collapse during the molding process.

15. The molding process of claim 10 wherein the step of applying negative pressure to draw the extruded column comprises the step of flashing the extruded column to the edges of the mold cavity.

16. The molding process of claim 10 further comprising the steps of:

injecting an in-fill material into an interior cavity of the molded article; and self-sealing the molded article.

17. A molding process comprising the steps of:

extruding an extruded column of polymer;

introducing the extruded column into a mold cavity having a predetermined surface profile;

molding the extruded column into contact with the entire surface profile of the mold cavity, to produce a molded article;

injecting an in-fill material into an interior cavity of the molded article; and self-sealing the molded article, wherein the extruded column is cradled to prevent mechanical collapse during the molding process.

* * * * *